United States Patent [19]
Wilson et al.

[11] Patent Number: 5,795,637
[45] Date of Patent: Aug. 18, 1998

[54] FLOOR COVERING SEAM SEALER COVER

[75] Inventors: Wallace Andrew Wilson, 909 Coulter Rd., Sherwood, Ark. 72120; Charles E. Tanner, Benton, Ark.

[73] Assignee: Wallace Andrew Wilson, Sherwood, Ark.

[21] Appl. No.: 842,761

[22] Filed: Apr. 17, 1997

Related U.S. Application Data

[63] Continuation of Ser. No. 599,073, Feb. 9, 1996, abandoned.

[51] Int. Cl.$^6$ ............................................. B32B 3/06
[52] U.S. Cl. ................... 428/42.2; 428/43; 428/177; 428/179; 428/194; 428/343; 174/135
[58] Field of Search ........................ 428/42.2, 40.1, 428/41.7, 43, 177, 194, 343, 179; 174/135

[56] References Cited

U.S. PATENT DOCUMENTS

| | | | |
|---|---|---|---|
| 3,545,154 | 12/1970 | Bobzin et al. | 52/460 |
| 3,676,974 | 7/1972 | Daly | 52/716 |
| 4,313,991 | 2/1982 | Lamb | 428/131 |
| 4,933,220 | 6/1990 | Petzold et al. | 428/61 |
| 5,140,088 | 8/1992 | Ehrhart et al. | 528/59 |
| 5,206,070 | 4/1993 | Haibach et al. | 428/194 |
| 5,278,356 | 1/1994 | Miller | 174/117 A |

*Primary Examiner*—Alexander Thomas

[57] ABSTRACT

A rectangular foldable blank along the length of which parallel lines of adhesive tape are applied near each edge and covered with removable protective film, and which parallel slit score lines run near each long edge just inside the tape line, and a regular score line bisecting the length of the blank, and perforations dissecting the width of the blank at select intervals. Also, to the seam sealer cover formed from the blank producing a tent like structure with continuous parallel adhesive tab portions running the length of the structure at both edges. And, to the assembly formed when one or more of the aforementioned seam sealer covers are installed by adhering the adhesive tab portions to a floor covering surface in such a method as to cover and protect the entire length of a floor covering seam and line of seam sealer from debris contamination and foot traffic within the hollow formed by the assembly and floor covering surface. And, to the assembly formed when one or more of the aforementioned assemblies are installed one on top of the other so as to produce a multiple ply assembly thereby allowing a variable strength of assembly to protect the entire length of a floor covering seam and line of seam sealer from varying degrees of contamination from debris and foot traffic.

22 Claims, 2 Drawing Sheets

FLOOR COVERING SEAM SEALER COVER

CROSS REFERENCE TO RELATED APPLICATIONS

This is a continuation of U.S. patent application Ser. No. 08/599,073, filed on Feb. 9, 1996, now abandoned.

BACKGROUND OF THE INVENTION

1. Field of the Invention

The present invention relates in general to protective floor covers and, more particularly, to an apparatus and method of preventing seam sealer contamination from debris and foot traffic after installing resilient vinyl floor covering.

2. Background of the Invention

The final step in installing resilient vinyl floor covering involves applying a clear liquid known as seam sealer over or into the length of all seams that result from joining one sheet of material to the other. It is common knowledge in the floor covering industry that the correct application and cure of seam sealer is critical to the performance of the products installed. The sealer, once cured, adheres to and protects the floor covering seam from penetration of liquids and foreign matter that would otherwise seep between and underneath the flooring product and destroy its inherent aesthetic and performance characteristics. Such seam sealers are disclosed in European Patent Office Document No. 0239890, Petzoid et al. U.S. Pat. No. 4,933,220, and Ehrhart et al. U.S. Pat. No. 5,140,088.

Floor covering installation failure resulting from uncured seam sealer getting contaminated with dirt and construction debris, and installation failure resulting from the uncured sealer getting walked on, are costly problems in the floor covering and related construction industries. Seam sealer is clear, and must dry from one to eight hours undisturbed to ensure no seam and seam sealer contamination occurs resulting in job failure. In the event the seam or sealer does get contaminated, a common solution is to attempt to repair the floor by removing the sealer and/or a portion of the floor covering and reinstalling a patch of new material to replace the contaminated areas. Due to the composition of the various floor covering products and sealers available, and to the high level of skill this process requires of a tradesman, it is increasingly more difficult, and in many cases impossible, to obtain the desired result of maintaining the integrity of the floor covering system once job failure has occurred. Also, it is likely the consumer will not accept a patched floor and will justifiably demand full replacement as the only acceptable solution to a botched job.

To make the problem worse, sealer contamination is an issue that no entity within the floor covering industry takes responsibility for. The industry as a whole has adopted a "hope for the best" attitude when it comes to seam sealer protection based on the assumption that whoever contaminates the sealer is responsible for the repair or replacement costs involved. However, since it is rarely possible to determine who actually ruined the sealer after the fact, and even more difficult to get the consumer to accept responsibility for what they perceive to be negligence on behalf of their floor covering contractor or home builder, the result is that manufacturers, wholesalers, retailers, installers, builders, and consumers alike spend a great deal of money reacting to this ongoing problem.

Traditionally, the profit margins obtained by each of these entities in practicing their respective businesses was high enough to cover the additional expense of repair and replacement. But, this is not the case anymore. As a result, there has been a growing awareness and some improvements directed at controlling this type of job failure, but the improvements made are more directed at controlling a particular entity's liability from such failure, as opposed to solving the problem; the problem being that seam sealer is clear and virtually invisible if properly applied, and that it is sticky until fully cured: a process that requires from one to eight hours.

Seam sealer and seam failure is a predominate cause of consumer dissatisfaction in the vinyl floor covering arena. Manufacturers, wholesalers, retailers, installers, and home builders have all introduced products and practices designed to address this particular problem, none of which are very effective.

1. Manufacturers redeveloping and offering improved sealers and catalysts or drying agents designed to speed the curing process from an average eight hours to as little as one to two hours. In that regard, Armstrong World Industries introduced the #S-570 seam sealer and #S-591 applicator kit combination (Re: Ehrhart et al. U.S. Pat. No. 5,140,088), one of the most significant improvements in the industry in years since a one or two hour cure certainly reduces the likelihood of seam contamination many fold over an eight hour cure. Nonetheless, this solution is still not very effective because the sealer and catalyst mixture still requires at least a full hour to cure; it only takes seconds to contaminate a seam. Additionally, the new catalyzed sealers are permanent once dry; they cannot be rejuvenated by a second application or solvent as could former products. The installer cannot simply remove the contaminated sealer, except by sanding, and reapply new sealer. Often, the floor covering itself must be replaced to solve the problem.

Another reason this system is not effective is the catalyst has not been well received by the labor force. The product is expensive for an already low-wage earner to use. This causes two problems: The product is not used, or it is used with disregard for the manufacturer's instructions concerning the precise mix and open time in which once mixed, the product must be used. A tendency of tradesmen is to improperly proportion the sealer to the catalyst (to save the cost of sealer), or, to use the mixture after the recommended open time has lapsed (again, to reduce costs). A third problem that occurs is the installer may not mix the product long enough to achieve a thorough mix. The result of all these tendencies is job failure as the sealer may take weeks to cure and/or discolor.

2. Wholesalers have also introduced solutions directed at solving the seam sealer contamination problem. For example, Adleta Company, an Armstrong distributor, has intermittently made available commercially produced seam "tents", about an 18" long paper tent designed to set over the seam to mark the location of freshly applied sealer. Likewise, Armstrong World Industries produced a similar tent several years ago comprised of a long, brightly colored section of carpet tube approximately 32" long and halved lengthwise to be placed over fresh seams. Likewise, Brandon Company, a multi-line floor covering wholesaler based in Little Rock, Ark., offered yet another style of tent several years ago comprised of a rigid plastic right angle approximately 48" long to be placed over fresh seams.

These tents are somewhat effective in that they mark a seam's location and are commercially produced; people do not confuse them as easily for job site debris and trash as they do with homemade tents commonly made by installers from scrap vinyl or cardboard found on the job. They stand out better on the floor as something that was placed there for a reason. Seam tents in general, whether or not they are homemade, are not effective and, in practice, are rarely used because they do nothing to protect the sealer from debris contamination and foot traffic beyond marking a seam location. Additionally, a gust of wind or accidental bump may shift the tent and cause the seam sealer to smear as well as become contaminated.

Another problem, particularly with the Armstrong and Brandon Company products, was their high cost. These tents were designed to be used over and over from one job to the next. They were durable, but expensive. This is probably the main reason they never became commonly used in the field as a special trip back to the job to recover them was required and this defeated their inherent economy.

3. Manufacturers, wholesalers, and retailers have all typically responded to the above problems by producing literature or sales contract clauses warning the builder and consumer about the possibility of seam sealer contamination in an effort to avoid responsibility for repair and replacement liability. This practice, though common, is ineffective particularly on new construction job sites and structures undergoing extensive remodeling because there are too many people involved in such projects to get the message across. Though such clauses may protect a particular entity from a legal standpoint, they contribute little to protecting the sealer, and nothing to building effective customer relationships.

4. Installer standard trade practices do not impose the responsibility of protecting the sealer after application on the installer. Since this is the final step in the installation process, the installer usually leaves the job site within minutes of applying the sealer. However, sometimes the installer will build a makeshift tent or marker from scrap materials thereby illuminating the location of the seam for all to see. As already stated, such tents are ineffective: especially the homemade type as they are often mistaken for trash and ignored.

Note that particularly conscientious installers sometimes build partial covers out of the heavy tubes the floor covering products come rolled on. The installers cut the tubes lengthwise and place them over the length of the seam and tape them across the width of the seam to the floor. The tubes are constructed of heavy gauge fiberboard and have exceptional compressive strength, so in this respect they provide excellent protection against foot traffic. However, the availability, type, and amount of tube used will vary from installer to installer and job to job. Also, the type and amount of tape used to secure these type covers to the floor is important to their protectiveness of the sealer as it is the tape that gives the cover its tensile strength with relation to its points of attachment, and thereby differentiates its inherent performance from that of tents. If the tube gets bumped, because of its long length and exceptional strength, the tape may shear at its points of attachment to the floor causing the tube to shift and smear and contaminate the sealer. Paper masking tape is predominately used in the field, and shears easily.

Job site made covers manufactured from tubes do not make effective dust covers as it is difficult to cut the thick fiberboard evenly enough to keep dirt from entering the enclosure between the floor and the irregularly cut tube. Additionally, they are very labor intensive to make. Since nobody pays for this extra, it is increasingly rare to find this method of protection being practiced.

5. Home builders who must maintain the integrity of the floor covering system allow downtime in vinyl areas after installation to accommodate the sealer curing process: they try to schedule the other trades a day or two following vinyl floor installations. Over the course of several jobs, this costs the builder money. Downtime is expensive as most building contracts involve large sums of borrowed money and subsequent interest expenses. In general, building is a performance business where time is money.

6. Production oriented builders, those engaged in the construction of apartment buildings for example, are generally not as concerned about job quality and precise esthetics as residential home builders. Their job is to get the projects built and rented in the fastest possible way as the increased rentals will more than offset the cost of repairs that will result from sealer contamination. Often, sealer is not used at all on projects of this nature because trade activity is so intense it is obvious the sealer will get tracked all over the floor. Also, the tenants will not complain about patches being installed to remedy unsightly areas. Nonetheless, a two or three-hundred unit apartment complex vinyl repair bill will often cost several thousand dollars.

Illustrated above, seam sealer contamination poses a number of serious problems in the floor covering and related industries, and efforts to overcome these problems have yielded less than desirable results.

SUMMARY OF THE INVENTION

It is therefore an object of the present invention to provide a device and method for use in protecting uncured seam sealers from debris contamination and foot traffic immediately following a resilient vinyl floor covering installation.

It also is an object of the present invention to provide such a device which is of simple, inexpensive construction; and to provide such a device in a lightweight compact form that can be assembled quickly and easily, thereby reducing the amount of cargo capacity and expense required to transport the device to a job site and minimize time required for its installation; and to provide such a device that can be securely installed without requiring additional supplies and sundries; and to provide such a device that can be installed in a single or multiple ply arrangement, thereby allowing the applicator to adapt the tensile and compressive strength of the assembly to the requirements of a particular job; and to provide such a device which, after it has accomplished its purpose of protecting the seam sealer from the time of application until completely dry, will be simple for a unskilled person to remove and discard in a common household waste receptacle.

The foregoing objects can be accomplished by providing a disposable tent-like cover designed to install over the entire length of a floor covering seam after seam sealer application. In the preferred embodiment of the invention, a rectangular cardboard blank is formed along the length of which parallel lines of adhesive tape are applied near each edge and covered with a protective removable film, and also along the length of which parallel score lines run near each edge just inside the tape line, and also a score line bisecting the length of the blank, and also perforations bisecting the width of the blank at select intervals.

The preferred embodiment of the invention is also directed to the device formed from the blank producing a tent like structure with continuous parallel adhesive tabs running the length of the structure at both edges, and to the assembly formed when one or more of the aforementioned devices are installed by adhering the adhesive tabs to the flooring surface in such a manner as to cover the entire length of the floor covering seam and sealer within the enclosure formed, and to the assembly formed when one or more of the aforementioned assemblies are installed one on top of the other so as to produce a multiple ply assembly thereby allowing a variable strength of assembly.

DESCRIPTION OF THE PREFERRED EMBODIMENT

Figure 1:
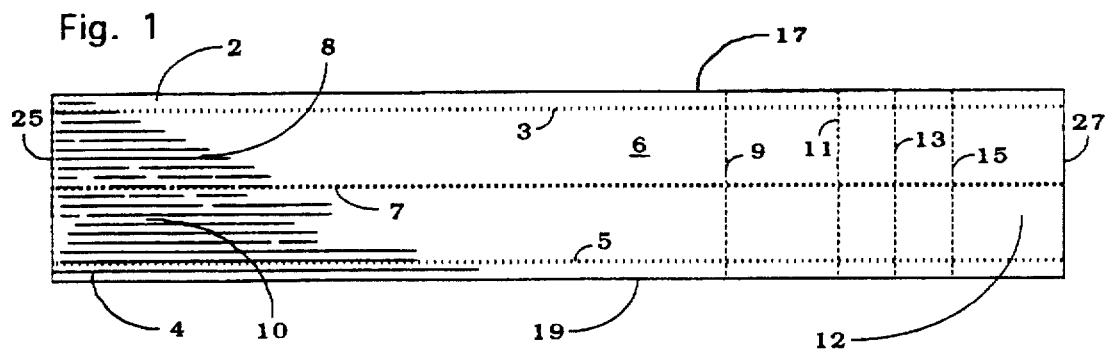
FIG. 1 illustrates a top elevation of the rectangular cardboard blank in accordance with the preferred embodiment of the invention.

Referring first to FIG. 1, a top perspective of the planar rectangular corrugated cardboard blank there illustrated, has a length and width and upper and lower surfaces. The blank has first and second slit score lines 3 and 5 extending lengthwise along the lower surface near first and second edges 17 and 19, respectively, to divide the blank into first and second tab portions 2 and 4 and a center panel 6. Tab portion 2 extends from slit score line 3 to edge 17. Tab portion 4 extends from slit score line 5 to edge 19. Center panel 6 extends between score lines 3 and 5.

The blank has a third regular score line 7 extending lengthwise along the lower surface of the blank, and dividing center panel 6 into a first sub-center panel 8 extending between score lines 3 and 7, and a second sub-center panel 10 extending between score lines 5 and 7.

Also, the blank has a left end 25. And, the length is approximately 36 inches. Four ⅛"×⅛" perforated lines 9, 11, 13, and 15 extend perpendicular to the length at approximately 24, 28, 30, and 32 inches from the left end, respectively.

Also, the blank has a right end 27. And a removable tab portion 12 is formed between perforated line 15 and the right end comprising a segmented section of tab portions 2 and 4, and sub-center panels 8 and 10, respectively.

Figure 2:
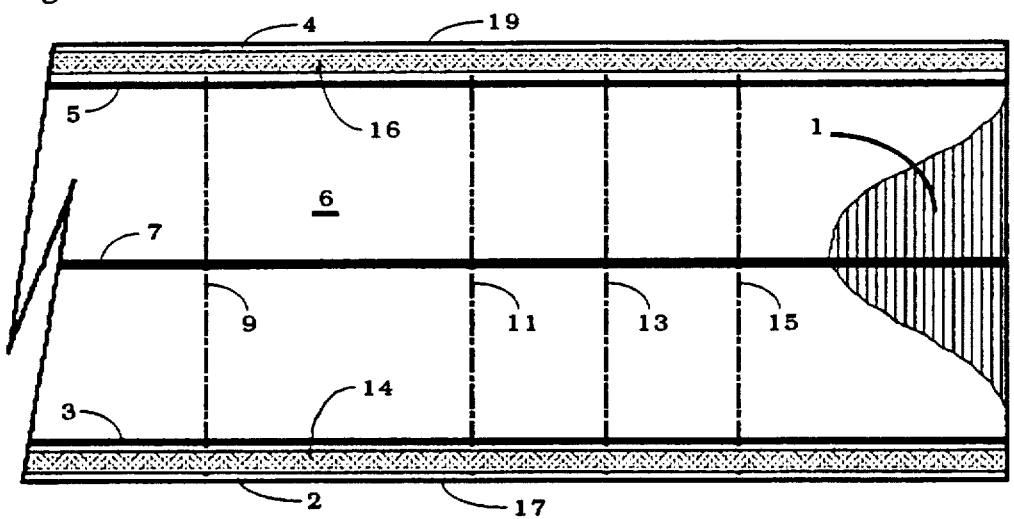
FIG. 2 is a enlarged fragmentary inverted view of the blank of FIG. 1.

FIG. 2, a enlarged fragmentary inverted view of the blank of FIG. 1 illustrates first and second adhesive tape lines 16 and 14 depicting adhesive tape permanently attached to tab portions 4 and 2 substantially parallel to each other and edges 19 and 17, respectively, since parallel application of the adhesive tape on such a blank is much easier, requiring simpler tape application machinery using the technique and equipment customarily used in segments of the folding carton industry. Also, here shown is section 1 of the blank depicting a view where the paper skin of the lower surface of the corrugated cardboard is removed illustrating the ridges and grooves of the corrugated cardboard are aligned perpendicular to the length of the blank. The ridges and grooves will run with the width of the rectangular blank so as to increase the compressive strength of the device formed in FIGS. 4 and 5, and to increase the ease in which the width of the blank can be folded, and subsequently, the length shortened at perforation lines 9, 11, 13, and 15.

Figure 3:
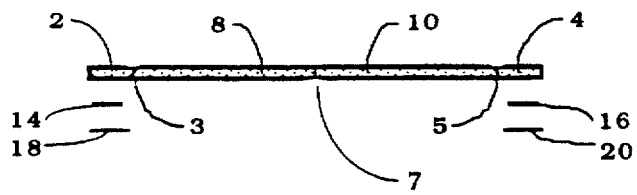
FIG. 3 is a enlarged end view of the blank of FIG. 1, including a exploded view of the adhesive tape system in accordance with the preferred embodiment of the invention.

FIG. 3, a enlarged left end perspective of the blank of FIG. 1, including a exploded view of the preferred adhesive tape system used in accordance with the present invention, illustrates tab portions 2 and 4, having upper and lower surfaces, hingedly connected by slit score lines 3 and 5, and sub-center panels 8 and 10 hingedly connected by regular score line 7, in their respective locations.

Also illustrated, the preferred adhesive tape system comprising first and second lengths of adhesive tape 14 and 16 permanently attached to the lower surfaces of tabs 2 and 4, and covered by strips of removable paper film 18 and 20, respectively.

Figure 4:
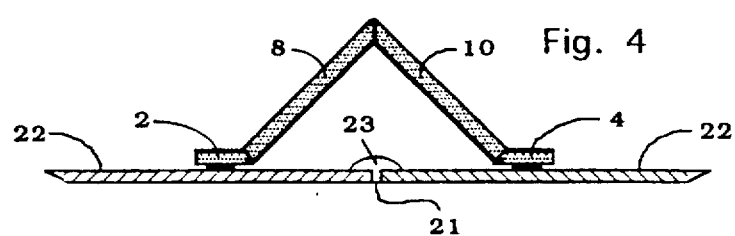
FIG. 4 shows a enlarged end view of the seam sealer cover formed from the blank of FIG. 1 in set-up condition in accordance with the preferred embodiment of the invention.

FIG. 4, a enlarged left end perspective of the seam sealer cover formed from the blank of FIG. 1, illustrates sub-center panels 8 and 10 having upper and lower surfaces and inner and outer edges. The inner edges of sub-center panels 8 and 10 being connected so that the lower surfaces of the sub-center panels form a first angle that is less than 180 degrees. And tab portions 2 and 4 having upper and lower surfaces and inner and outer edges, the inner edge of tab portion 2 being connected to the outer edge of sub-center panel 8 so that the lower surfaces of tab portion 2 and sub-center panel 8 form a second angle that is greater than 180 degrees. And, the inner edge of second tab portion 4 being connected to the outer edge of sub-center panel 10 so that the lower surfaces of tab portion 4 and sub-center panel 10 form a third angle that is greater than 180 degrees.

Figure 5:
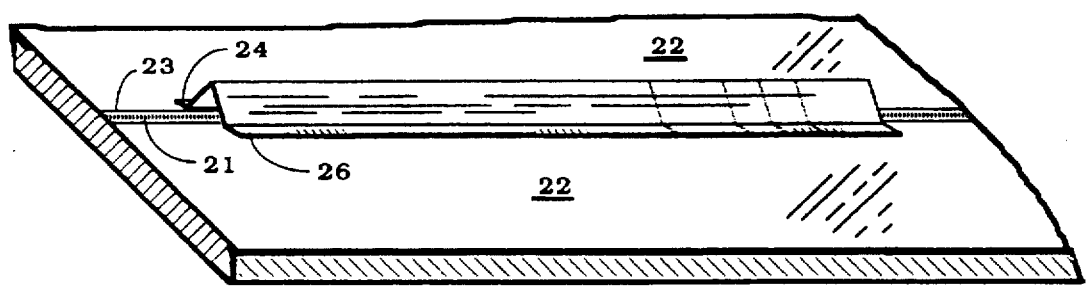
FIG. 5 is a perspective view of the seam sealer cover formed from the blank of FIG. 1 in set-up condition as seen from a side-top view in accordance with the preferred embodiment of the invention.

FIG. 5, a perspective view of the seam sealer cover formed from the blank of FIG. 1 in set-up condition as seen from a side-top view in accordance with the preferred embodiment, and FIG. 4, illustrate that when the blank is to be used, it will be shaped to its useful form as shown, and attached to the installed floor covering surface 22 by way of the continuous adhesive tape system illustrated in FIGS. 2 and 3, in such a manner as to enclose the floor covering seam 21 and sealer 23 in a rigid structure comprising of sub-center panels 8 and 10, adhesive tab portions 2 and 4, and incorporating the installed floor covering surface 22.

This can easily be accomplished by folding the blank of FIG. 1 along score lines 3, 5, and 7 to form the seam sealer cover shown, and then removing adhesive tape covers 18 and 20 of FIG. 3, and then positioning the seam sealer cover lengthwise over the floor covering seam 21 as illustrated, and then running the fingers along the top of adhesive tab portions 2 and 4 along the length of the seam sealer cover with sufficient pressure to securely adhere each tab to the floor covering surface 22.

Figure 6:
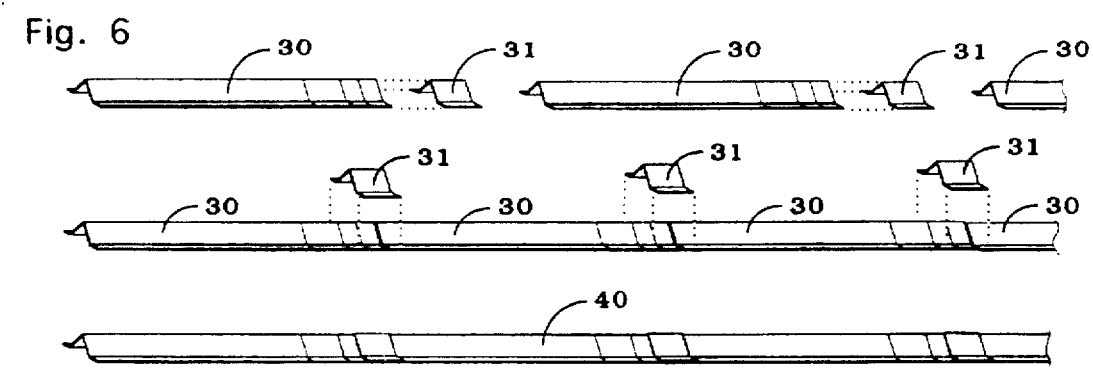
FIG. 6 is a series of perspective views of the single-ply assembly formed from one or more of the devices of FIG. 5 as seen from a side-top view in accordance with the preferred embodiment of the invention.

FIG. 6 illustrates the preferred method of assembly of a plurality of the seam sealer covers of FIG. 5 to form a continuous single-ply assembly 40 in accordance with the preferred embodiment of the invention. In practice, when any length of a substantially straight floor covering seam and line of seam sealer needs protecting, but exceeds the length of a single seam sealer cover, a plurality of the tent like covers can be adhered adjacently to the floor covering over the length of the seam securely enclosing the entire length of the seam and seam sealer within the hollow formed in a continuous, rigid, protective structure.

When the assembly 40 is to be used, it will be formed by providing a plurality of the rectangular cardboard blanks of FIG. 1 and detaching tab 12 of each blank at its respective perforation line 15. This can most easily be accomplished by folding back and forth each blank across its width at perforation line 15, thereby weakening the cardboard, then removing tab 12 by securely gripping tab 2 between the thumb, and index and middle fingers of each hand just outside perforation line 15, to the left and right respectively, and tearing through tab 2 and its respective adhesive tape and tape cover to score line 3. The blank should then be inverted, and the process repeated to tear through tab 4, and in a continuous motion, through center panel 6 along perforation line 15 until tab 12 is detached from the main body of the blank.

Then, to proceed with the preferred process of assembly illustrated in FIG. 6, the main body and tab 12 of each blank of FIG. 1 required should be folded at score lines 3, 5, and 7, and shaped to its useful form as tent like cover 30 and tent like joint cover 31, respectively. As shown, each cover 30 and joint cover 31 has a raised central section with outwardly and downwardly extending sub-center panels formed and hingedly connected by a center score line. And each sub-center panel is hingedly connected by a score line to a outwardly extending tab portion extending the length of the cover and joint cover, respectively. Each cover 30 and joint cover 31 has a substantially tent like cross section.

After forming the number of covers and joint covers required to protect the length of seam, attach the plurality of covers 30 formed to the floor in accordance with instructions given for installing the single seam sealer cover of FIGS. 4 and 5. Start by installing the first cover 30 over one end of the floor covering seam. Then abut each successive cover 30 adjacently over the course of the seam terminating the assembly at the opposite end of the seam. The last cover 30 may need to be shortened by tearing through its width when the seam terminates at a wall or cabinet.

To complete the assembly 40 install joint covers 31 over each joint in the series of seam sealer covers 30 as shown in FIG. 6, where each joint cover straddles a joint formed between the adjacently positioned covers. This will prevent debris from passing through the joints.

Figure 7:
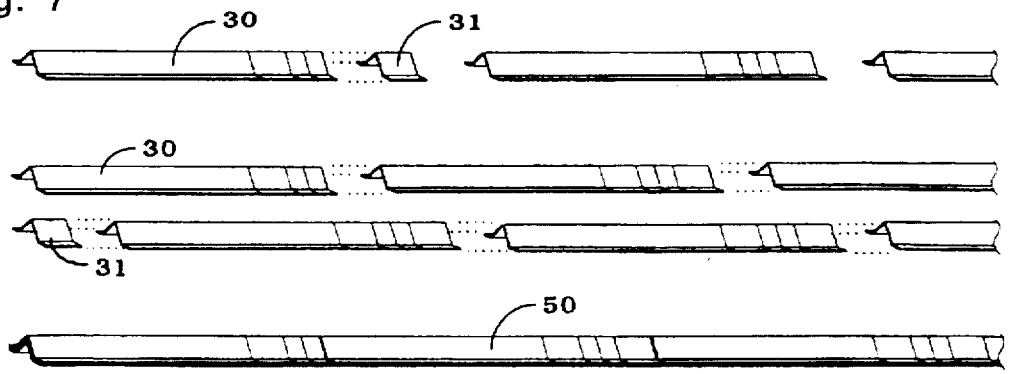
FIG. 7 is a series of perspective views of the two-ply assembly formed from two or more of the devices of FIG. 5 as seen from a side-top view in accordance with the preferred embodiment of the invention

FIG. 7 illustrates the preferred method of assembly of a series of the seam sealer covers of FIG. 5 to form a continuous two-ply assembly 50 in accordance with the preferred embodiment of the invention. In practice, when the job site conditions warrant a extra measure of protection against foot traffic, the multiple ply assembly is preferred. When the assembly 50 is to be used follow the steps outlined for the single-ply assembly 40. However, it is only necessary to form a single joint cover 31 from one of the blanks of FIG. 1. Start by installing the single joint cover 31 over one end of the floor covering seam. Then abut successive seam sealer covers of FIG. 5 over the course of the seam terminating the assembly at the opposite end of the seam. Then, start the second ply by lining up the left edge of another cover 30 with the left edge of the joint cover 31, and install the other cover 30 over the end of the course of the first assembly. Then abut successive seam sealer covers of FIG. 5 adjacently over the course of the first assembly terminating the second assembly at the opposite end of the first assembly. This process will stagger the joints of the second assembly over the joints of the first assembly so a debris-proof environment will occur.

Additional plies can be added simply by adding another series of the seam sealer covers of FIG. 5 to the top of the assembly 50, however, additional plies would rarely be necessary as a average man (180 lbs.) can forcefully apply his full weight with one or both feet across or along the ridge of the two-ply assembly 50 without causing significant variation in the structure and protection offered by the assembly.

In cases where the applicator will not be terminating the enclosure formed by the seam sealer cover of FIG. 5, or the assemblies 40 or 50 of FIGS. 6 and 7, respectively, against a baseboard, wall, door jamb, or cabinet, etc., it is necessary to enclose the open end of the structure to ensure a debris-proof environment is obtained. This can easily be accomplished by folding a tab 12 of FIG. 1, or other small length of the blank, along score line 7 to form a right angle. Then fold one tab (2 or 4) to form a inverse right angle to its respective sub-center panel (8 or 10). Then abut the assembly formed perpendicularly to the end of the enclosure. For example, tab 2 will adhere to the floor, sub-center panel 8 will abut and cap the end of the enclosure, and sub-center panel 10 and tab 4 will run across the ridge of the enclosure. In this example, the adhesive tape cover from tab 4 would be removed, and tab 4 adhered to the ridge of the enclosure thereby securing the end cap formed.

In the preferred embodiment, the adhesive tape system will comprise: a permanently attached adhesive tape covered by a removable paper cover; and a water soluble removable adhesive applied to the lower face of the tape for adhering to the floor. The strength of adhesion will be such that by firmly lifting on the adhesive tabs, the seam sealer cover and/or covers, and/or assemblies 40 and 50 formed, can be lifted from the floor. Any adhesive residue can be removed from the floor with warm water.

In the preferred embodiment, the length of the blank of FIG. 1 will be about 36" and the width about 6½": the length being about that of a standard 3-0 inside door unit since vinyl seams often occur in doorways. Likewise, perforation lines 15, 13, 11, and 9 represent the approximate length of standard inside door units 2-8, 2-6, 2-4, and 2-0 respectively, as measured from the left edge of the blank. This will allow the installer to apply the seam sealer cover in doorways in a efficient fashion without the use of tools.

Also, in the preferred embodiment, markings such as those printed on a yardstick, or meterstick, including increments, will be printed along the upper surface of each sub-center panel of the blank of FIG. 1 along score line 7. Hence, a useful household yardstick can be formed from the blank of FIG. 1 simply by removing the adhesive tape covers, then folding the blank along score line 7 in such a manner whereby the tape surfaces are made to adhere one to the other.

The invention described throughout the specification offers utility in the protection of floor covering seam sealers, however, this is only its primary function. Since the components comprising the invention are of printable matter, verbiage added to the invention will add to its utility as a protective device, and allow it to function as a sign, advertisement, etc. For example, an alternate use for the invention will be to channel and protect extension cords from excessive foot traffic at trade shows and conventions. One could print "Caution: Electrical Wires" on both sub-center panels in this example to offer a extended measure of protection in this usage.

The invention as yardstick idea, coupled with a company's advertisement, is another example of an alternate use:

Though in this example, the utility of the device in its primary function may be of little concern to its promoter.

It will be apparent that modifications in accordance with the preferred embodiment can be made by those skilled in the art without departing from the spirit thereof. It is equally apparent the assembly and components involving the adhesive tape system, methods of attachment, folding of the blank, and the assembly of the devices and structures of FIGS. 6 and 7, may be rearranged in order to accomplish these steps without departing from the scope of the invention.

It will be obvious to those skilled in the art that various changes may be made without departing from the scope of the invention, and the invention is not to be considered limited to the recommended application of the device and structures built therefrom, or to what is shown in the drawings or described in the specifications.

What is claimed is:

1. A blank comprising:

a substantially planar, substantially rectangular member having a length and width and upper and lower surfaces, said member having first and second score lines extending lengthwise along said lower surface of said member near first and second edges, respectively, of said member to divide said member into first and second tab portions and a center panel, said first tab portion extending from said first score line to said first edge, said second tab portion extending from said second score line to said second edge, and said center panel extending between said first and second score lines;

said member having a third score line extending lengthwise along said lower surface of said member and dividing said center panel into a first sub-center panel extending between first and third score lines, and a second sub-center panel extending between second and third score lines; and an adhesive applied to portions of said lower surface of said member along said first and second tab portions.

2. The blank of claim 1 wherein said member is cardboard.

3. The blank of claim 1 wherein said member is corrugated cardboard and wherein ridges and grooves of said corrugated cardboard are aligned substantially perpendicular to said length of said member.

4. The blank of claim 1 wherein said member has a perforated line extending across said width of said member substantially perpendicular to said length.

5. The blank of claim 1 wherein said member has a left end, said length is approximately 36 inches, and wherein four perforated lines extend across said width, substantially perpendicular to said length at approximately 24 inches from said left end, approximately 28 inches from said left end, approximately 30 inches from said left end, and approximately 32 inches from said left end, respectively.

6. The blank of claim 2 wherein said adhesive is an adhesive tape permanently attached to said first and second tab portions and wherein said adhesive tape is covered by first and second strips of removable paper film.

7. The blank of claim 6 wherein said member has a right end, and wherein a perforated line extends across said width near said right end to define a tab portion extending between said perforated line and said right end.

8. A seam sealer cover comprising:

first and second sub-center panels having a length and a width and upper and lower surfaces and inner and outer edges extending lengthwise, said inner edges of said first and second sub-center panels being connected so that lower surfaces of said first and second sub-center panels form a first angle that is less than approximately 180 degrees;

first and second tab portions having a length and a width and upper and lower surfaces and inner and outer edges extending lengthwise, said inner edge of said first tab portion being connected to said outer edge of said first sub-center panel so that said lower surfaces of said first tab portion and said first sub-center panel form a second angle that is greater than approximately 180 degrees, said inner edge of said second tab portion being connected to said outer edge of said second sub-center panel so that said lower surfaces of said second tab portion and said second sub-center panel form a third angle that is greater than approximately 180 degrees; and adhesive applied to said lower surfaces of said first and second tab portions for adhering said cover to a floor covering.

9. The seam sealer cover of claim 8 wherein said first and second sub-center panels and said first and second tab portions are cardboard.

10. The seam sealer cover of claim 8 wherein said first and second sub-center panels and said first and second tab portions are corrugated cardboard and wherein ridges and grooves of said corrugated cardboard are aligned substantially perpendicular to said length of said first and second sub-center panels and said first and second tabs.

11. The seam sealer cover of claim 8 wherein said first and second sub-center panels and said first and second tab portions have a perforated line extending across said width substantially perpendicular to said length of said first and second sub-center panels and said first and second tab portions.

12. The seam sealer cover of claim 8 wherein said first and second sub-center panels and said first and second tab portions have a left end, said length is approximately 36 inches, and wherein four perforated lines extend across first and second sub-center panels and said first and second tab portions, substantially perpendicular to said length at approximately 24 inches from said left end, approximately 28 inches from said left end, approximately 30 inches from said left end, and approximately 32 inches from said left end, respectively.

13. The seam sealer cover of claim 8 wherein said adhesive is an adhesive tape permanently attached to said first and second tab portions and wherein the said adhesive tape is covered by first and second strips of removable paper film.

14. The seam sealer cover of claim 8 wherein said first and second sub-center panels and said first and second tab portions have a right end, wherein a removable tab portion extending between said perforated line at approximately 32 inches from said left end, and said right end, is formed comprising segmented sections of said first and second tab portions and said first and second sub-center panels.

15. The seam sealer cover of claim 8, further comprising markings for use in measuring lengths printed on said upper surfaces of said sub-center panels along said inner edges of said sub-center panels.

16. A blank comprising:

a substantially planar, substantially rectangular member having a length and width and upper and lower surfaces, said member having first and second score lines extending lengthwise along said upper surface of said member near first and second edges, respectively, of said member to divide said member into first and second tab portions and a center panel, said first tab portion extending from said first score line to said first edge, said second tab portion extending from said second score line to said second edge and said center panel extending between said first and second score lines;

said member having a third score line extending lengthwise along said lower surface of said member and dividing said center panel into a first sub-center panel extending between said first and third score lines and a second sub-center panel extending between said second and third score lines; and an adhesive applied to portions of said first and second tab portions.

17. The blank of claim 16 wherein said member is cardboard.

18. The blank of claim 17 wherein said adhesive is an adhesive tape permanently attached to said first and second tab portions and wherein said adhesive tape is covered by first and second strips of removable paper film.

19. The blank of claim 18 wherein said member has a right end, and wherein a perforated line extends across said width near said right end to define a tab portion extending between said perforated line and said right end.

20. The blank of claim 16 wherein said member is corrugated cardboard and wherein ridges and grooves of said corrugated cardboard are aligned substantially perpendicular to said length of said member.

21. The blank of claim 16 wherein said member has a perforated line extending across said width of said member substantially perpendicular to said length.

22. The blank of claim 16 wherein said member has a left end, said length is approximately 36 inches, and wherein four perforated lines extend across said width, substantially perpendicular to said length at approximately 24 inches from said left end, approximately 28 inches from said left end, approximately 30 inches from said left end, and approximately 32 inches from said left end, respectively.

* * * * *